Sept. 7, 1937.  H. F. RILEY  2,092,085
TEMPERATURE CONTROL DEVICE
Filed Feb. 19, 1935
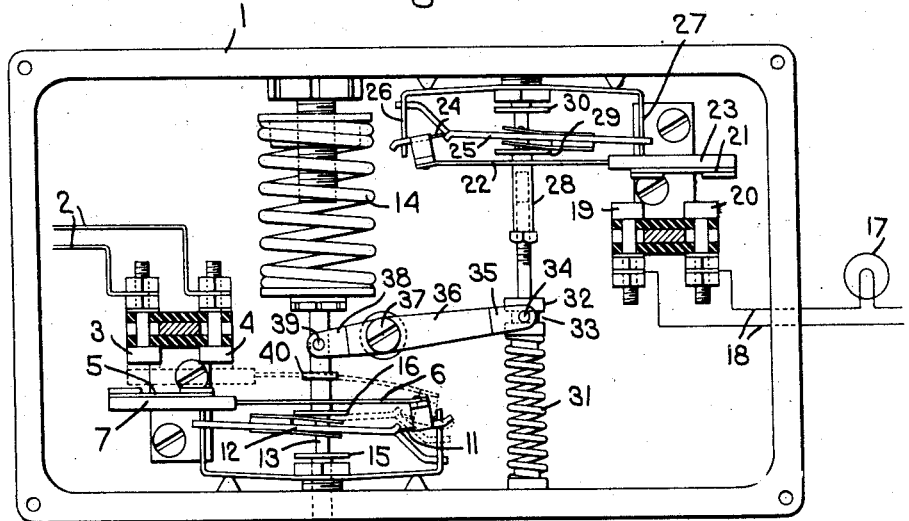
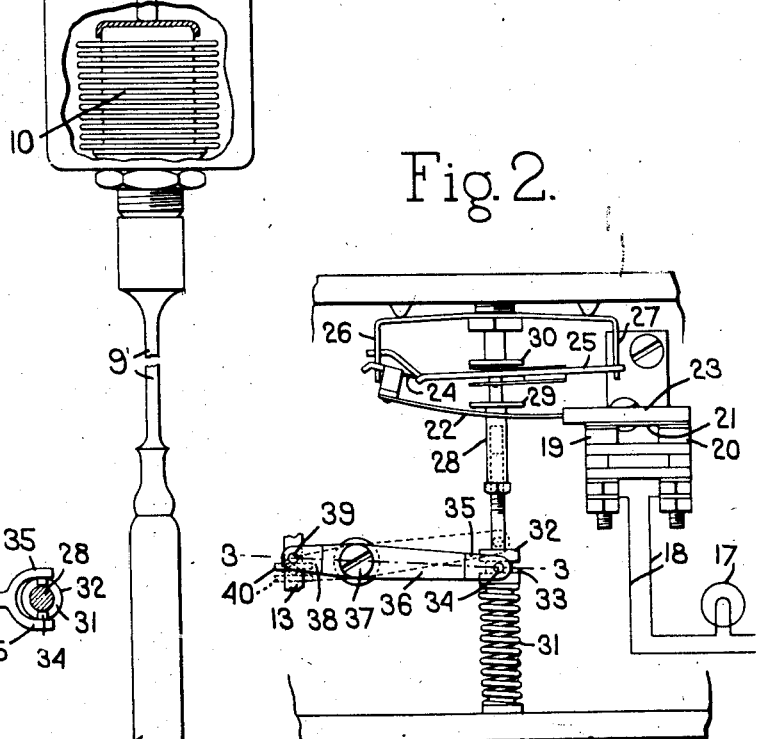
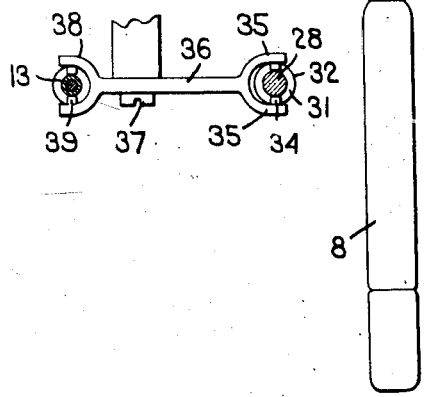
Inventor.
Henry F. Riley
by Heard Smith & Tennant.
Attys.

Patented Sept. 7, 1937

2,092,085

UNITED STATES PATENT OFFICE 2,092,085

TEMPERATURE CONTROL DEVICE

Henry F. Riley, Boston, Mass.

Application February 19, 1935, Serial No. 7,192

8 Claims. (Cl. 200—83)

This invention relates to temperature control devices by which the temperature in any room, compartment or space is controlled within prescribed limits, and the invention has for its general object to provide improvements by which a signal or some other suitable indication will be automatically given in cas the temperature in said space exceeds said prescribed limits either by rising above or by falling below said limits.

In order to give an understanding of the invention I have chosen to illustrate it as it might be embodied in a temperature control device for refrigerating systems, and especially for electric refrigerating systems such as are found in household electric refrigerators, but I wish to state that the invention is not limited in its application to use in connection with electric refrigerating systems, but may be used in connection with other devices that involve means for controlling the temperature within prescribed working limits.

Temperature control devices for refrigerating systems usually comprise a control switch for opening and closing the circuit of the motor by which the refrigerating apparatus is operated, and means for actuating the switch as the temperature in the refrigerating chamber rises above or falls below certain prescribed working limits so as to maintain the desired temperature in said chamber.

In some temperature control devices the operation of the switch is under the control of a thermostatic element which is responsive to changes in temperature in the refrigerating chamber and which causes the switch to close the motor circuit when the temperature in the refrigerating chamber reaches the upper prescribed working limit (such limit being frequently referred to as the "cut-in" point) and to open the motor circuit when the temperature in the refrigerating chamber falls to the desired lower working limit, which lower limit is frequently referred to as the "cut-out" point.

In other temperature control devices the control switch for opening and closing the motor circuit is controlled by a pressure actuated element, the operation of which is responsive to changes in pressure in the refrigerating system. These pressure control devices are constructed so as to close the motor circuit when the temperature in the refrigerating chamber reaches the "cut-in" point and to open the switch when the temperature reaches the "cut-out" point.

My invention is adapted for use in connection with either type of temperature control device, but for purposes of illustration I have shown it herein as it might be embodied in a temperature control device of the thermostatic type.

My improvements provide a second switch which becomes operative when the temperature in the refrigerating chamber rises to a predetermined point above the "cut-in" point thereby to actuate a signal, either audible or visible, which indicates that the temperature-controlling circuit is not functioning properly to reduce the temperature in the refrigerating chamber.

Under normal operating conditions the closing of the control switch by either the thermostatic element or by the pressure-controlled element when the temperature reaches the "cut-in" point will start the refrigerating apparatus in operation, thereby causing a reduction of temperature in the refrigerating chamber. If, however, the operation of the refrigerating apparatus is faulty or if some other abnormal conditions exist such as the blowing of a fuse or the like, the closing of the control switch will not initiate the usual refrigerating action in which case the temperature in the refrigerating chamber would continue to rise. With my invention such continued rise in temperature to a predetermined point above the "cut-in" point will actuate the second switch, thereby operating the signal and giving indication that the refrigerating system is not functioning properly and thus requires attention.

My improvements are of such a nature that as soon as the temperature in the refrigerating chamber falls from the abnormal point which caused the signal to be exhibited to a point within the prescribed working limits of temperature the signal will be automatically discontinued, thus showing that normal conditions are again restored.

As stated above I have chosen to illustrate my invention as it might be applied to the temperature control device of a refrigerating system in which the motor or control switch is actuated by a thermostatic element responsive to changes in temperature in the refrigerating chamber.

Fig. 1 is a view with parts broken out showing a temperature control for electric refrigerating systems having my improvements applied thereto.

Fig. 2 is a detail view of the switch which controls the signal circuit.

Fig. 3 is a section on the line 3—3 Fig. 2.

In the drawing, 1 indicates a housing or box within which the operative parts of the apparatus are received, and 2 indicates a motor circuit for operating the electric motor that runs the compressor or other refrigerating apparatus. The motor switch or control switch by which the motor circuit 2 is opened or closed is shown as comprising two contacts 3, 4 which are insulated from each other and connected to opposite sides of the circuit, and a bridging contact 5 by which the contacts 3 and 4 are bridged or connected. This bridging contact 5 is carried by a resilient arm 6 but is insulated therefrom by suitable insulation 7. The full line position in Fig. 1 shows the switch open and the dotted line position shows the switch closed. The opening and closing of the control switch is controlled by a thermostatic element of some usual type, that herein shown being in the form of a bulb 8 which is located in the refrigerating chamber or is subject to the temperature therein, and which contains a suitable fluid that will expand and contract as the temperature changes and which is connected by a small tube to a sylphon bellows 10. As the temperature in the refrigerating chamber rises, the expanding of the fluid in the bulb causes an expansion of the bellows 10 and such expansion results in closing the motor switch when the temperature reaches the "cut-in" point.

The control switch herein shown is one that is more or less commonly used in devices of this type and operates with a snap action. The resilient switch arm 6 is secured to one member 11 of a toggle device, the other member of which is indicated at 12. This toggle device may assume either the full line position, Fig. 1 or the dotted line position, the shift in position being accomplished with a snap action as is usual in devices of this type. 13 indicates a switch-actuating rod, one end of which is engaged by the bellows 10 and the other end of which is backed by a spring 14 that maintains the plunger in contact with the bellows as the latter expands and contracts. The plunger is provided with a collar 15 so situated that when the temperature in the refrigerating chamber reaches the upper working limit or "cut-in" point, the expansion of the bellows will have raised the plunger into a position to bring the collar 15 against the toggle member 12. Any further upward movement of the plunger will cause the toggle to snap from the full to the dotted line position, thereby closing the bridging contact 5 onto the other contacts 3, 4 with the result that the motor will be set in operation. If the refrigerating apparatus is working normally the starting of the motor will initiate the refrigerating operation, thereby causing a lowering of the temperature in the refrigerating chamber with the consequent contraction of the bellows. As the bellows contract the spring 14 forces the plunger 13 downwardly and when the temperature in the refrigerating chamber has reached the "cut-out" point a second collar 16 on the plunger operates to snap the toggle from the dotted to the full line position, thereby opening the control switch so that the refrigerating action will cease.

The parts thus far described are such as are usually found in temperature control devices of this type and form no part of my present invention. In these temperature control devices provision is usually made for adjusting the tension of the spring 14 thereby providing for varying the "cut-in" and "cut-out" points, and for this purpose one end of the spring 14 is usually backed by a nut 50 carried on a screw-threaded stem 51 so that by adjusting the screw 51 the tension of the spring 14 and consequently the "cut-in" point can be varied.

As stated above, the present invention provides a second switch controlling a signal or indicating mechanism, which switch is structurally independent from the control switch but is actuated thereby to render the signal operative whenever the temperature to be controlled rises a predetermined amount above the "cut-in" point. The display or operation of the signal thus indicates that the refrigerating action did not begin properly when the motor switch was closed.

Any suitable signal may be employed and merely for illustrative purposes I have shown a lamp 17 which is in a second signal circuit 18. A suitable switch for the signal circuit is provided which is normally open but which is closed automatically in case the temperature in the refrigerating chamber rises appreciably above the "cut-in" point. The second switch herein shown in the signal circuit 18 is similar in construction to that in the motor circuit in the control switch; it comprises two contacts 19, 20 insulated from each other and connected to opposite sides of the signal circuit and a bridging contact 21 carried by a resilient switch arm 22 but insulated therefrom as shown at 23 and by which the contacts 19, 20 are connected. This switch arm 22 is also constructed to operate with a snap action and it is shown as connected to one member 24 of a toggle device, the other member of which is shown at 25. These toggle members 24, 25 are pivoted at their ends in resilient arms 26, 27 and are adapted to move with a snap action from the position shown in Fig. 1, in which the switch is open to that shown in Fig. 2, in which the switch is closed. The toggle 24, 25 is given its movement through the medium of a rod 28 carrying the two collars 29 and 30 that are situated on opposite sides of the toggle member 25. This rod 28 is backed by a suitable spring 31 which tends to hold it in its raised position. Means are provided whereby an abnormal expanding action of the bellows 10 due to a rise in temperature in the refrigerating compartment to an abnormal point, that is, a point appreciably above the "cut-in" point, will cause a downward movement of the rod 28 sufficient to bring the collar 30 against the toggle member 25, thereby snapping the toggle member into the position shown in Fig. 2 and consequently closing the second switch which controls the signal circuit. The rod 28 is provided with a head portion 32 having a groove 33 in which is received pins 34 carried by the arms 35 of the forked end of a lever 36, the latter being pivotally mounted at 37. The other end of said lever is also forked as shown at 38 and the arms of the fork carry pins 39 that embrace the plunger 13. This plunger has a collar 40 thereon which is situated so that it is below and out of contact with the pins 39 during normal operation of the thermostatic element. In other words, the collar is so situated that when the temperature in the refrigerating chamber has reached the "cut-in" point the expansion of the bellows will have carried the plunger upwardly to a point where the collar is just about to engage said pins.

If the temperature in the refrigerating chamber continues to rise to an abnormal point the further expansion of the bellows 10 will raise the plunger 13 sufficiently to bring the collar 40 into engagement with the pins 39, thereby shifting the lever 36 from the full line position Fig. 1 or the dotted line position Fig. 2, into the full line position Fig. 2. This shifting movement of the lever 36 will lower the rod 28 and thereby close the switch of the signal circuit 18. The signal will thus be displayed and will indicate that the refrigerating action is not proceeding properly in the refrigerating chamber.

If the abnormal condition should correct itself or as soon as it is corrected and the refrigerating action begins so as to lower the temperature in the refrigerating chamber, the consequent contraction of the bellows will allow the plunger 13 to move downwardly under the influence of the spring 14, and as the plunger moves downwardly the expansion of the spring 31 will move the rod 28, thereby opening the switch of the signal circuit 18. The construction is such that this opening movement will occur just about at the time that the temperature in the refrigerator has fallen to the "cut-in" point, or in other words, as soon as the temperature in the refrigerating chamber returns within the normal limits. The pins 39 and collar 40 constitute a lost motion connection between the switch-actuating rod 13 and the lever 36 by which the switch-operating rod 28 for the second switch will be actuated to close said second switch when the switch-actuating rod 13 has moved upwardly a predetermined amount above the point at which it actuated the control switch. The second switch, therefore, is actuated only when the temperature to be controlled rises a predetermined number of degrees above the "cut-in" point, and this temperature differential between the operation of the control switch and the second switch is not affected by any adjustment or change in the "cut-in" point resulting from adjustment of the tension of the spring 14. Hence, with my improvements the second switch will be actuated to give the signal whenever the temperature rises a predetermined point above the "cut-in" point regardless of any variations which may be made in the "cut-in" point.

In the device illustrated the movement of the switch-actuating rod 13 results from the expansion and contraction of the bellows 10 and this expansion and contraction in turn result from a variation in pressure of the gas confined within the bellows due to change in the temperature to be controlled. Therefore, the switch-actuating rod 13 may be said to be one, the movement of which responds to changes in pressure, or, in other words, the control switch may be described as one which is responsive to changes in pressure, said switch being closed when the pressure reaches a predetermined point and opening when the pressure drops below another predetermined point.

While I have illustrated and described herein one form of my invention and one way in which it may be applied, yet the invention is not limited to the constructional features shown but may be varied in many ways without departing from the invention. In the construction herein illustrated the operation of the control switch when the temperature, and consequently the pressure in the sylphon bellows, reaches the predetermined point results in closing said switch, but the important feature of the invention is that the control switch is operated when the temperature or the pressure reaches a predetermined high point or a predetermined low point, and the question as to whether the operation of the control switch results in closing a circuit or opening a circuit depends upon the character of the devices in said circuit which are to be controlled by the circuit.

I claim:—

1. A temperature control device comprising a switch for closing and opening a temperature-changing circuit, thermostatically-controlled switch-operating means for operating the switch when the temperature rises to a predetermined upper working limit, a second switch, a spring normally holding the second switch open and means including a lost motion connection and actuated by said switch-operating means to close the second switch against the action of the spring when the temperature to be controlled rises to a predetermined amount above said predetermined upper working limit, said spring operating to open said second switch when the temperature falls again to approximately said upper working limit.

2. A temperature control device comprising a control switch for opening and closing a temperature-changing circuit, switch-operating means for operating the switch when the temperature to be controlled rises to a predetermined upper working limit, a second switch structurally separate from the control switch and having no control over the temperature-changing circuit, means actuated by the switch-operating means and including a lost motion connection to actuate the second switch once when the temperature to be controlled rises a predetermined amount above said upper working limit and to operate the second switch a second time when the temperature falls again to approximately said upper working limit.

3. A temperature control device comprising a control switch for opening and closing a temperature-changing circuit, means for operating the switch when the temperature to be controlled rises to a predetermined upper working limit, means for adjusting said switch-operating means to vary said upper working limit, a second switch, and means actuated by said switch-operating means to operate said second switch once when the temperature to be controlled rises a predetermined amount above any predetermined upper working limit for which said switch-operating means is set and to operate said second switch again when the said temperature again falls to said upper working limit.

4. A temperature control device comprising a control switch for closing and opening a temperature-changing circuit, a switch-operating member movable in one direction in response to a rise in the temperature to be controlled and in the opposite direction in response to a fall of said temperature and adapted to operate the control switch when said temperature reaches a predetermined upper working limit, a second switch, a spring-pressed switch actuator normally holding said second switch open, and connections between said actuator and said switch-operating member for closing the second switch against the action of its spring when the switch-operating member has by a continued rise in temperature been moved a predetermined distance additional to that required to actuate the control switch, said spring operating automatically to open the second switch when the switch-operating member reaches a predetermined point in its movement in response to a fall in temperature.

5. A temperature control device comprising a control switch for closing and opening a temperature-changing circuit, switch-operating means for operating the switch when the temperature to be controlled rises to a predetermined upper working limit, a second switch, a spring normally holding said second switch open, and connections between the second switch and the switch-operating means for the control switch by which the second switch is closed against the action of its spring and the latter is subjected to increased tension when the temperature to be controlled rises a predetermined amount above the upper working limit, said spring serving to open the second switch automatically as the temperature falls and approaches said upper working limit.

6. A temperature control device comprising a control switch for opening and closing a circuit, switch-operating means controlled by variations in pressure to operate the switch when the pressure reaches a predetermined working limit, a second switch structurally separate from the control switch but having no control over said circuit, means actuated by the switch-operating means and including a lost motion connection to actuate the second switch once when the pressure exceeds the working limit by a predetermined amount and to actuate the second switch a second time when the pressure returns again to said working limit.

7. A temperature control device comprising a control switch for opening and closing a circuit, an element which is subjected to varying pressures between normal upper and lower working limits, switch-operating means responsive to and actuated by variations in the pressure to which said element is subjected to operate the control switch when the pressure reaches a working limit, a second switch, means actuated by the switch-operating means to operate the second switch once when the pressure exceeds the working limit by a predetermined amount and to operate said second switch a second time when said pressure again returns to the working limit.

8. A temperature control device comprising a control switch for opening and closing a temperature-changing circuit, switch-operating means including a spring normally holding the switch open, means responsive to a rise in the temperature to be controlled for moving the switch-operating means in one direction and thereby closing the switch against the pressure of the spring when the temperature reaches a predetermined upper working limit, a second switch separate from the control switch and having no control thereover or over said circuit, switch-actuating means for the second switch including a second spring normally holding said second switch open, and a lever connected to the switch-operating means for the control switch and through which the second switch is actuated once upon a continued movement of the switch-operating means for the control switch due to a continued rise in temperature above the said upper working limit, said second spring and lever cooperating to actuate the second switch again when the switch-operating means moves in a reverse direction responsive to a fall in temperature to said upper working limit.

HENRY F. RILEY.